United States Patent [19]

Rosengren et al.

[11] 4,350,146
[45] Sep. 21, 1982

[54] SOLAR COLLECTOR

[76] Inventors: Bengt Rosengren, Dosvagen 7, 240 21 Loddekpinge; Christer Persson, Hyllevagen 3, 230 40 Bara, both of Sweden

[21] Appl. No.: 182,360

[22] Filed: Aug. 29, 1980

[51] Int. Cl.³ ............................................. F24J 3/02
[52] U.S. Cl. ................................ 126/447; 126/446; 126/901; 165/179
[58] Field of Search ............... 126/421, 446, 447, 448, 126/450, 900, 901; 165/179

[56] References Cited

U.S. PATENT DOCUMENTS

| | | | |
|---|---|---|---|
| 3,039,453 | 6/1962 | Andrassy | 126/450 |
| 3,980,071 | 9/1976 | Barber | 126/450 |
| 4,120,289 | 10/1978 | Bottum | 126/421 |
| 4,125,108 | 11/1978 | Porter | 126/448 |
| 4,138,997 | 2/1979 | LaPorte | 126/446 |

FOREIGN PATENT DOCUMENTS

| | | | |
|---|---|---|---|
| 2748688 | 3/1979 | Fed. Rep. of Germany | 126/446 |
| 2398983 | 3/1979 | France | 126/448 |

*Primary Examiner*—Samuel Scott
*Assistant Examiner*—G. Anderson
*Attorney, Agent, or Firm*—Beveridge, DeGrandi, Kline & Lunsford

[57] ABSTRACT

A solar heat collector made up of several metal plates, each bent to provide a first planar portion and a second planar portion at substantially 90°, with a flanged hole through each first portion. One or more metal tubes passes through the holes of the plates to position the plates with their second portions forming a substantially continuous sheet. Spacers maintain the plate spacing so that the plate second portions do not overlap. The tubes and flanges are sized so that the tubes are squeezed as they pass through the plate holes, assuring good thermal contact between the tubes and the plates.

2 Claims, 11 Drawing Figures

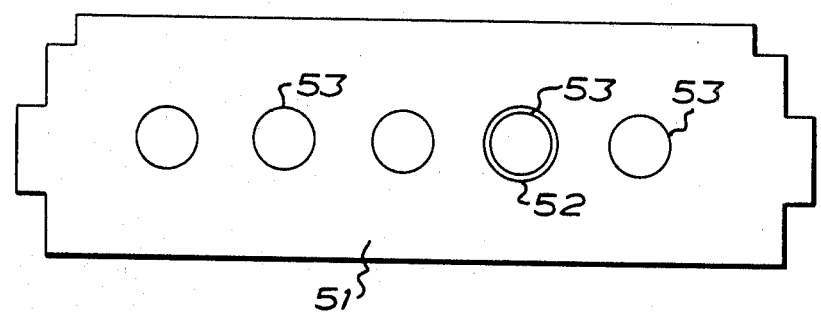
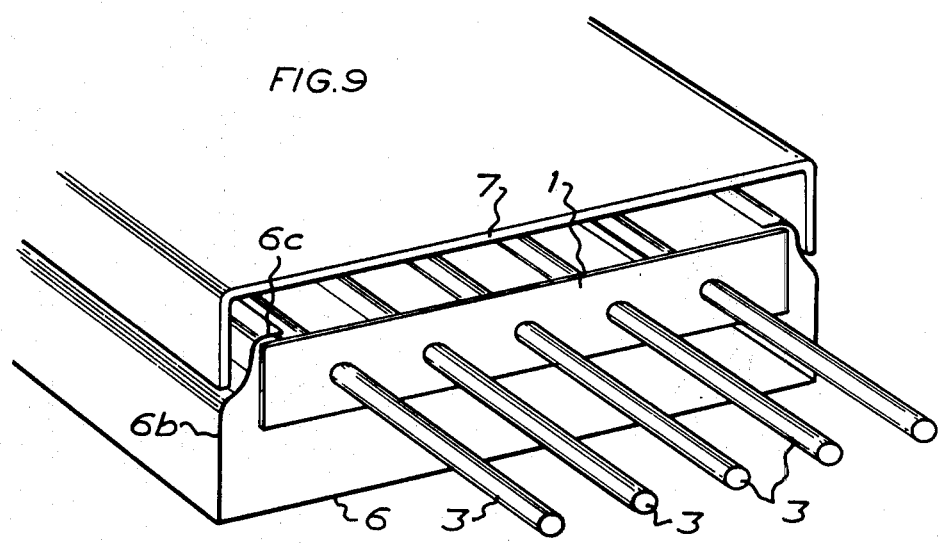

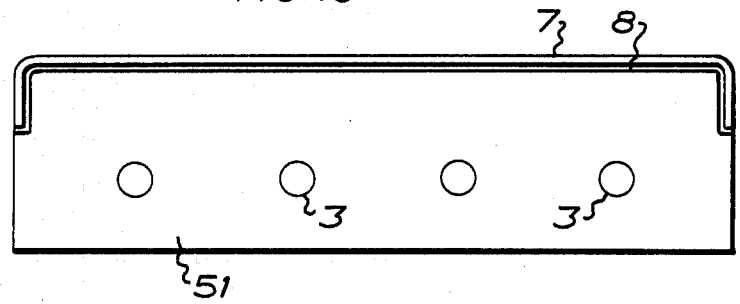
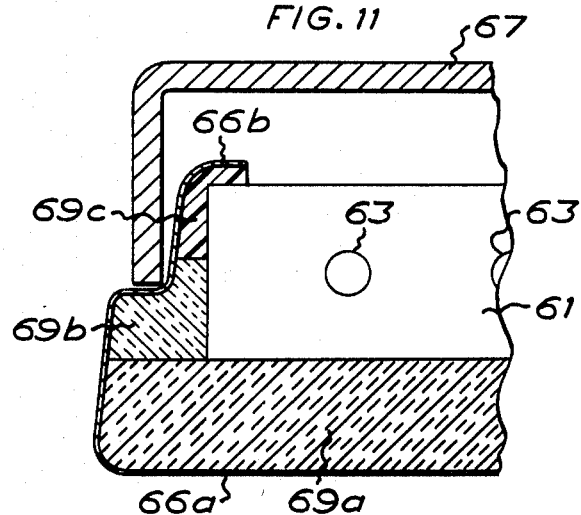

SOLAR COLLECTOR

The present invention relates to a solar collector having a solar heat absorber, which consists of metal sheet and tubing, preferably made of metal, in heat conduction contact with the metal sheet. A refrigerant is caused to flow through the tubing, when the solar collector with its absorber is subjected to sun light, in order to make the refrigerant collect the solar heat, which is absorbed by the metal sheet.

It is known how to produce a solar collector absorber by joining copper tubing and a copper sheet by soldering, preferably thereby achieving a metallurgical bond between the tubing and the sheet. Solar heat which is absorbed by the sheet flows through the bond to the tubing, and the refrigerant flowing through the tubing is heated as a consequence. However, the bond area is relatively small, and the heat conduction is not very efficient. It is known to make grooves in the sheet in order to enhance the bond area between the tubing and the sheet, but this does not lead to a noticeable improvement of the heat transfer and it is expensive to shape the sheet in such a way that precision grooves are formed.

Thus, the object of the present invention is to produce in an economical way a solar heat absorber from metal sheet and tubing, the absorber having an improved heat conduction between sheet and tubing. Another object of the invention is to improve the bond between sheet and tubing as regards the area of the bond as well as the contact quality of the same.

We have found in accordance with the present invention that the absorber sheet advantageously is subdivided into a plurality of plates. The plates are provided with flanged holes in the same number as the number of tubes of the absorber. The tubes are squeezed through the holes in order to achieve a satisfactory thermal contact between the tubes and the flanges and to keep the plates together against each other thereby, possibly using spacers between the plates. The plates preferably are provided with a solar heat absorbing layer. In this way the solar heat absorption of the absorber will be efficient even when the angle of incidence of the solar radiation against the plate surface is large. Solar heat absorbed in the plates flows surprisingly easily via the flanges of the holes to the tubes and the refrigerant, provided the thermal contact between the walls of the tubes and the flanges of the holes of the plates is satisfactory.

In a preferred embodiment of the invention each plate is bent at an angle and thus forms two or more continuous portions. One first portion of the plate is designed to absorb solar heat and one second portion is provided with said flanged holes. When the tubes have been squeezed through the flanged holes, the result being that the plates are kept together against each other, the first plate portions are forming one at least mainly continuous solar heat absorbing surface, and no spacers between the plates are needed. Solar heat absorbed in the first plate portions flows via the second plate portions to the flanges, the tubes and ultimately to the refrigerant.

An exceptionally satisfactory contact between the tubes and the flanges of the holes is achieved by squeezing metal balls through the tubes, which makes the tubes expand after they have been squeezed through the holes of the plates. Satisfactory thermal contact can also be achieved by applying a thermally conducting paste or a solder metal between the tubes and the flanges. It is also possible to use metal balls for the expansion of the tubes as well as a thermally conducting paste or a solder metal.

Nevertheless, the remainder of the solar collector, of which the solar absorber forms a part, may be designed in a conventional manner, having a base plate, a frame, a layer of an isolating material, which is placed on the base plate and on which the absorber is placed, as well as a covering plate. According to one embodiment of the invention at least some of the metal plates of the absorber are used as means of attachment for the frame or otherwise. According to another embodiment of the invention the two outer plates of the absorber are designed as terminal seals of the solar collector.

According to a special embodiment of the invention the base plate and the frame of the solar collector are made of one single plate, which is bent to give it flanges against which the edges of the cover plate are placed. A porous sealing strip suitably is inserted between the flanges of the frame and the cover plate as well as between the terminal seals and the cover plate. Also, it is advantageous to place a heat insulating filling material between the absorber and the frame.

The solar absorber may grow very hot, up to a temperature of several hundred degrees Celsius, and consequently, according to a special embodiment of the invention, spacing pieces of a heat resistant plastic material, e.g. teflon, are applied between the tubes of the absorber, in which the refrigerant flows, and the tubes to which the absorber tubes are connected and which are designed to supply refrigerant to and remove it from the absorber, e.g. tubes of an economical but heat sensitive polyvinyl chloride material.

The present invention also relates to a method of using the solar collector of the invention. A group of solar collectors according to the invention is illuminated by sunlight and a refrigerant is pumped through the group as well as through one or several radiators. Exterior air is made to flow against the radiators. The temperature of the exterior air is elevated with say 7°–12° C. This causes the water content of the air to decidedly decrease. Subsequently the air is brought in contact with a material, e.g. moist grass, in order to dry it.

In the following section, a few embodiments of the present invention are described in more detail with reference to the attached drawings, which are mainly diagramatical in nature. In the drawings:

FIG. 8 is a plan view of a component of a solar collector in accordance with the present invention;

FIG. 9 is a fragmentary perspective view of a solar collector in accordance with the present invention;

FIG. 10 is a plan view depicting a detail of a solar collector in accordance with the present invention; and FIG. 11 is a fragmentary cross sectional view showing another detail of a solar collector in accordance with the present invention.

Figure 1:
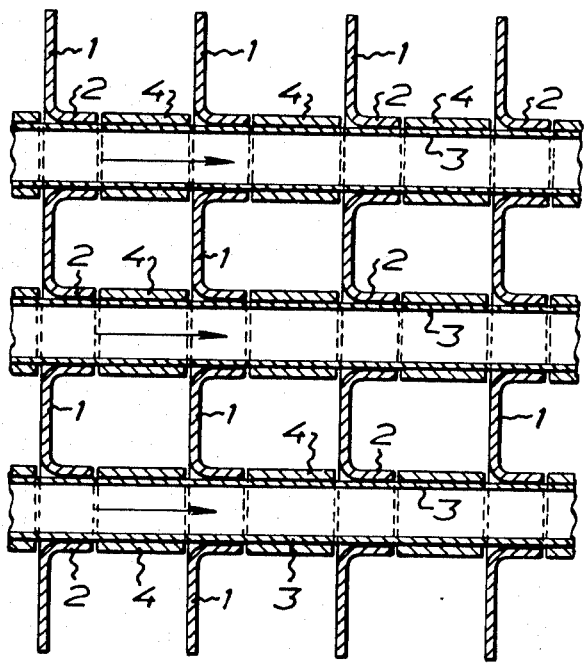
FIG. 1 is a horizontal cross sectional view, partially diagramatic in nature, of a solar heat collector in accordance with the present invention.

FIG. 1 shows diagrammatically and in a horizontal cross section a solar heat absorber according to the invention. The sheet plates 1 are provided with holes having flanges 2. Tubes 3 have been squeezed through the flanged holes and spacers shaped as sleeves 4 around tubes 3 have been placed between plates 1 in order to achieve the assembly shown in the figure. The arrows indicate the flow direction of a refrigerant in tubes 3. Thanks to the joint in the shape of a cylindrical shell, between the flanges and the tubes, the total contact surface is surprisingly large. Also, with balls are squeezed through tubes 3 in order to expand the latter to improve the contact with the flanges, the heat conduction between the flanges 2 and tubes 3 is exceedingly good.

Figure 2:
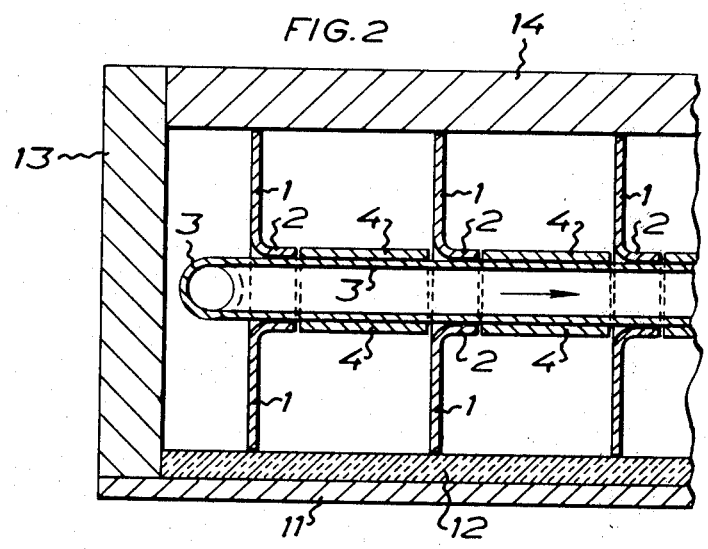
FIG. 2 is a vertical cross sectional view of a terminal portion of the solar collector of FIG. 1.

FIG. 2 is a vertical cross section of a terminal section of a solar collector having a plate absorber of the type described in FIG. 1. The solar collector consists of a base plate 11, an isolating material 12 placed on the base plate, a frame 13 and a transparent cover plate 14. Tubes 3 are fastened in frame 13 (not shown). The absorbing plates 1 support cover plate 14 and keep isolating material 12 in place. Provided the solar collector, when it is used, is turned in such a direction that plates 1 are positioned southwards, poor solar heat absorption will take place only for 10 minutes before and for 10 minutes after noon, which can be disregarded in view of the excellent qualitites of the absorber for the rest of the time.

Figure 3:
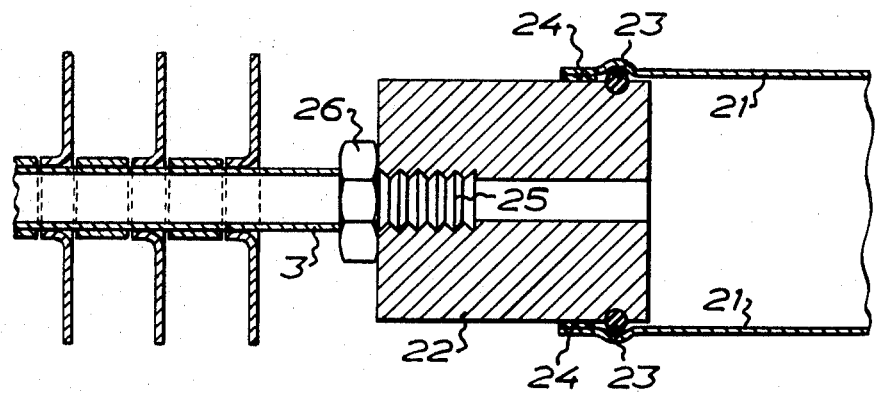
FIG. 3 is an enlarged fragmentary cross sectional view showing a detail of the solar collector of FIG. 1.

The solar heat absorber described in FIGS. 1 and 2 may become very hot, say 300° C., and in order to protect a tube 21, which is provided for the supply or the removal of the refrigerant (see FIG. 3) and which is made of e.g. polyvinyl chloride, a spacing material 22 of a heat resistant material, e.g. teflon, is placed between tube 21 and tube 3 in the way indicated in FIG. 3, using rings 23 and isolating material 24, a screw threading 25 of tube 3 as well as a locking nut 26.

Figure 4:
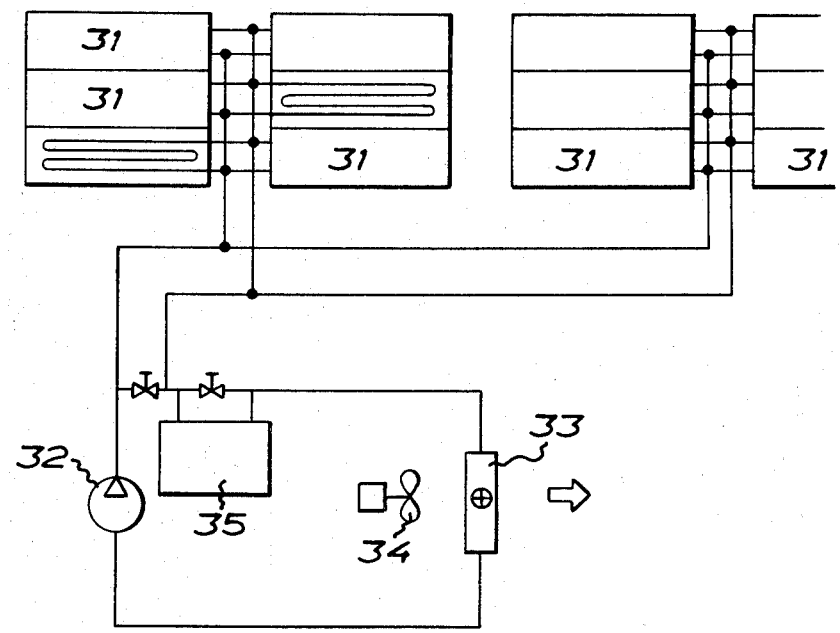
FIG. 4 is a diagramatical view depicting one use of a group of solar collectors in accordance with the present invention.

FIG. 4 shows how a group of solar collectors provided with solar heat absorbers of the type described in FIGS. 1-3 are used to dry moist grass. A pump 32 brings a refrigerant to flow through the absorbers 31 of the group and subsequently through the radiator 33, which is heated. The temperature of the air is elevated, say 7°-12° C., and consequently the air is made much more dry and can be used to dry the grass (not shown), through which it flows.

Figure 5:
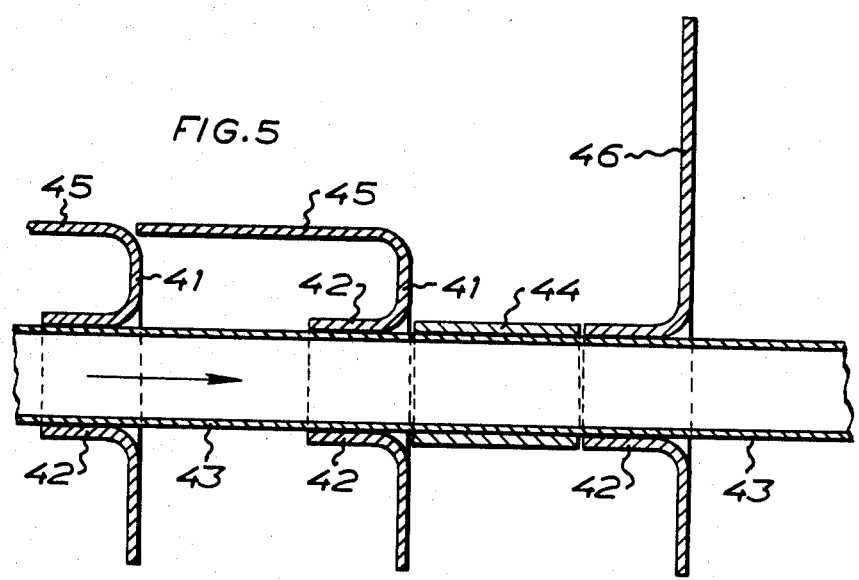
FIG. 5 is an enlarged fragmentary cross sectional view showing a detail of a solar collector in accordance with the present invention.

FIG. 5 shows how plates 41, which have been mounted on refrigerant tube 43 according to the invention, have been bent at an angle and how distinct solar heat absorbing surfaces 45 have been produced thereby. All the solar heat absorbing surfaces 45 of the plates form one substantially continuous solar heat absorbing surface. However, some of the plates 46 must not be bent, but instead serve as reinforcing means for the cover plate (not shown) of the solar collector.

Figure 6:
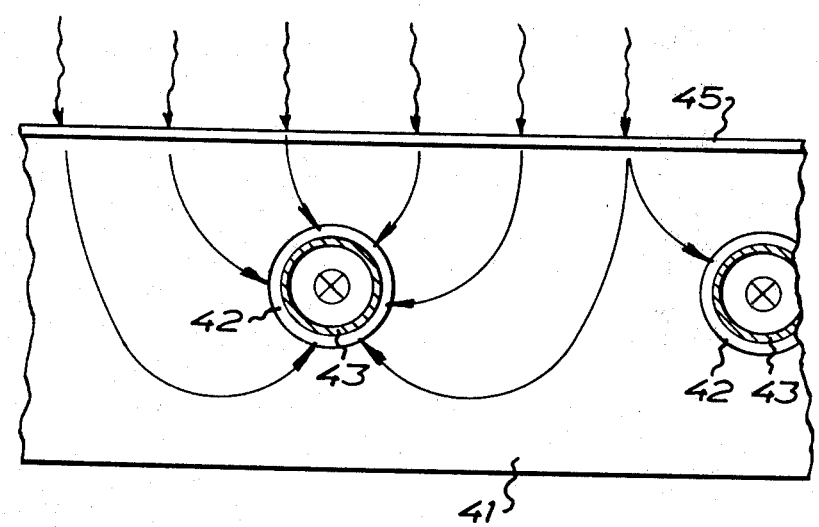
FIG. 6 is a diagramatical view depicting heat conduction in a solar collector in accordance with the present invention.

FIG. 6 shows one of the bent plates 41 of FIG. 5 having a flange or collar 42 around a tube 43. The path of the solar heat, absorbed in the surface 45 of the plate, to the refrigerant is indicated by arrows.

Figure 7:
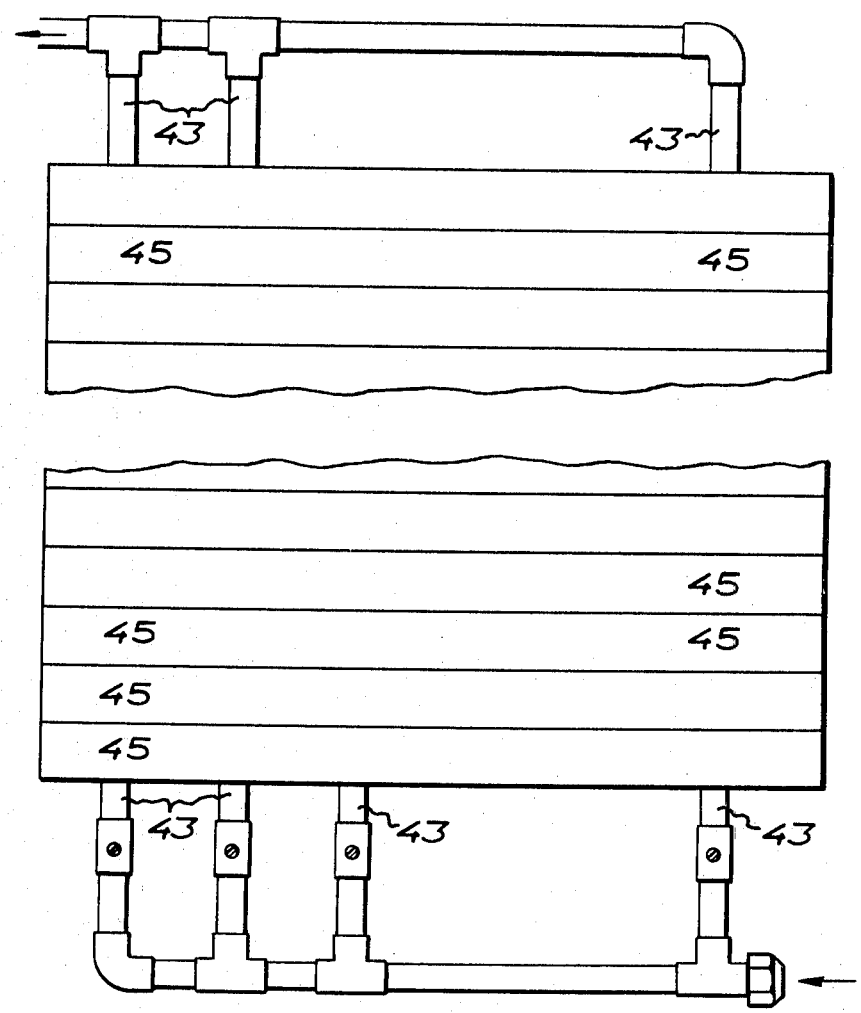
FIG. 7 is a broken elevational view of a solar collector in accordance with the present invention.

FIG. 7 is a planar view of a solar heat absorber having plates 41, which are bent at an angle according to the invention (not shown) and which have solar heat absorbing surfaces 45. The refrigerant flows through tubes 43 connected in parallel.

FIG. 8 shows a metal plate 51 designed as a terminal seal with refrigerant tubes 53 having flanges 52 around them.

FIG. 9 is a perspective view of a solar collector with its terminal seal removed. The outermost absorber plate 1 and tubes 3 are visible. Base plate 6 is shaped as a box having walls 6b and flanges 6c, against which plates 1 (only the outermost shown) have been adapted.

FIG. 10 shows the terminal seal 51 of FIG. 8, installed in the solar collector, an isolating strip 8 being inserted between the terminal seal and cover plate 7.

FIG. 11 shows a vertical cross section of a solar collector according to the invention having absorber plates 61, a base plate 66a, a frame flange 66b, isolating material 69a, filling isolating material 69b and an isolating covering strip 69c, as well as a cover plate 67.

We claim:

1. A solar heat collector comprising a plurality of metal plates, each having a planer first portion with a flanged hole therethrough and a planar second portion, the plane of which extends at substantially 90° with respect to the plane of the first portion; at least one tube member passing through said flanged holes to position said plates with said second portions forming a substantially continuous planar sheet, with the plane of one of said first portions and said second portions oriented substantially horizontally above at least a portion of said tube members, said at least one tube member having a cross sectional dimension at least equal to the cross sectional dimension of said flanged holes to cause said at least one tube member to be squeezed as it passes therethrough, the flanges of said flanged holes being in thermally conductive contact with said at least one tube member; and spacer means for spacing the second portions of adjacent ones of said metal plates to provide the substantially continuous planar sheet without overlapping of adjacent second portions.

2. A solar heat collector as claimed in claim 1 further comprising thermally conductive bonding means joining said tubes and said flanges.

* * * * *